United States Patent [19]
Rao et al.

[11] Patent Number: 5,469,777
[45] Date of Patent: Nov. 28, 1995

[54] PISTON ASSEMBLY HAVING ABRADABLE COATING

[75] Inventors: V. Durga N. Rao, Bloomfield Township; James R. Clarke, Northville, both of Mich.

[73] Assignee: Ford Motor Company, Dearborn, Mich.

[21] Appl. No.: 270,950

[22] Filed: Jul. 5, 1994

[51] Int. Cl.⁶ ..................................................... F16J 1/04
[52] U.S. Cl. ................. 92/223; 29/888.048; 29/888.049; 29/888.074; 451/49; 123/193.6
[58] Field of Search .................. 92/223, 212; 29/888.04, 29/888.044, 888.048, 888.049, 888.074; 277/235 A, 227; 451/49, 51; 123/193.6

[56] References Cited

U.S. PATENT DOCUMENTS

| | | | |
|---|---|---|---|
| 2,492,935 | 12/1949 | McCulloch et al. | 29/404 |
| 3,189,010 | 6/1965 | Isley | 92/231 |
| 3,759,148 | 9/1973 | Geffroy | 92/212 |
| 4,656,711 | 4/1987 | Yagi et al. | 29/59 |
| 4,899,702 | 2/1990 | Sasaki et al. | 123/193.6 |

FOREIGN PATENT DOCUMENTS

| | | | |
|---|---|---|---|
| 4113773 | 1/1992 | Germany | 123/193.6 |
| 108850 | 6/1984 | Japan | 123/193.6 |

*Primary Examiner*—F. Daniel Lopez
*Attorney, Agent, or Firm*—Joseph W. Malleck; Roger L. May

[57] ABSTRACT

A piston assembly operable within a fluid bathed, cylinder wall, comprising a piston body (10) having at least one annular land (36) adapted to be in close-fitting relationship to the cylinder wall (37) an abradable coating (15) tenaciously adhered to said at least the one land (36) effective to create and sustain substantially zero clearance with the fluid bathed cylinder wall and a heat sink in the form of at least one of (i) heat conductors (23) in the coating to conduct heat from the land (36) and (ii) a piston body interior (52) effective to receive a heat conducting fluid (26) moving along the interior to extract heat therefrom. The abradable coating comprises solid lubricants at least two of which are selected from the group consisting of graphite, molydisulphide and boron nitride The heat conductors in the coating preferably consist of copper particles distributed throughout the coating and constitute at least 70–90% by weight of the abradable coating.

11 Claims, 2 Drawing Sheets

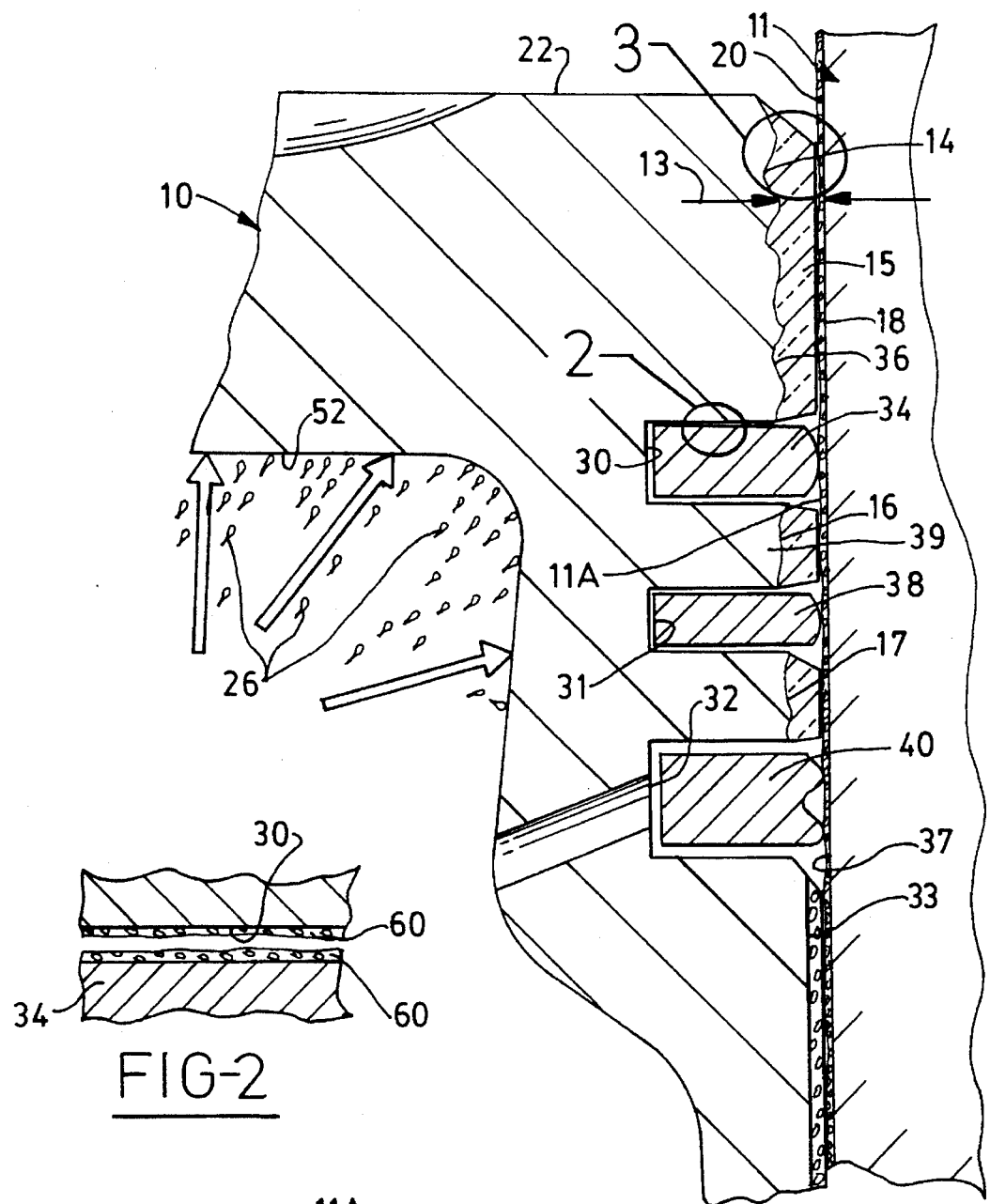
FIG-1
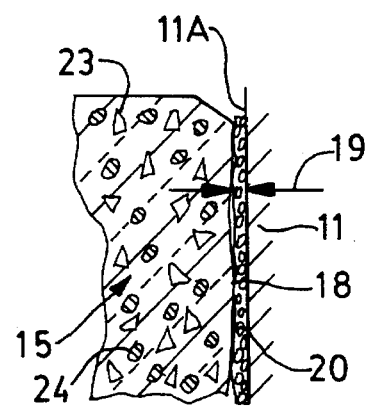
FIG-2
FIG-3

5,469,777

PISTON ASSEMBLY HAVING ABRADABLE COATING

BACKGROUND OF THE INVENTION

1. Technical Field

This invention relates to the art of designing and fabricating piston assemblies, and more particularly to piston designs that achieve substantially zero clearance with the surrounding cylinder wall within which it operates.

2. Discussion of the Prior Art

This invention addresses problems characteristic of current commercial internal combustion engine piston-cylinder assemblies: excessive crevice volume, premature ring fatigue failure, and excessive blow-by of fluids or induced oil combustion.

Crevice volume is the upper space between the piston and cylinder wall, including the ring groove spaces up to generally the point of sealing of the bottom compression ring; it increases with clearance between the piston crown and bore wall, and increases with groove size. A large crevice volume allows for the presence of unburned fuel to remain in the combustion chamber and thereby increase emissions. This is compounded at cold start when greater fuel is injected into the combustion chamber to initiate and sustain combustion; the resulting unburned fuel will not be readily converted by the exhaust catalyst due to the cold start conditions of the catalyst. It is well to keep in mind that the design of the piston relative to the cylinder bore wall is conventionally set for the smallest clearance at the maximum speed/load condition; therefore thermal expansion of the piston material relative to the bore wall material (i.e. aluminum pistons to a cast iron bore wall) will cause the crevice volume to increase the cold start condition.

It would be ideal to have a piston that reciprocates within a cylinder bore wall with no clearance between the piston crown and the bore wall and with little or no friction under all operating conditions. However, to attain durability of the interfacing materials, they have been restricted to those that may not produce the lowest friction, such as iron or steel coated with nickel or chromium for the piston rings, iron or aluminum for the bore wall which sometimes is coated with wear resistant coatings, and iron or aluminum for the piston skirt which sometimes is coated with wear resistant coatings. All of these coatings must be stable at extreme temperature cycling such as between −20° to 400° F. Accordingly, lower friction materials stable at lower temperatures may not be considered suitable to reduce crevice volume.

Premature fatigue failure of piston rings can be caused by high gas pressure bottoming out the compression rings in their grooves, while the piston slaps against the bore wall, thus jarring and stressing the frozen rings counter to their tension while they are dragged against a nonconforming cylinder wall. Since reciprocating forces change magnitude and direction every 180° (and a major change at firing pressure every 720°), such stressing constitutes impact loading of the rings. Impact loading leads to groove wear, ring instability (commonly referred to as flutter), and eventually ring failure by fatigue. Such rings can also get extremely hot accentuated by high friction of the rings within their grooves, allowing microwelding to take place in some instances. It would be desirable if a better thermal path was available, other than through the rings, for heat to be extracted from the piston and conveyed to the cylinder bore wall for ease of removal by the cooling jacket.

Blow-by or migration of combustion gases or fluid oil past the piston rings is a continuous problem for piston assembly design. Fluids can migrate from the combustion chamber past the back side, front side or through the split ends (commonly referred to as "end gap") of the piston rings; The ring dynamics described above, combined with these leakage paths, is usually accompanied by poor oil film scraping allowing oil to migrate upward into the combustion chamber resulting in contamination by deposits on the combustion chamber walls. Blow-by of combustion gases to the crank case, reduces engine compression and robs the engine of its designed power. More often than not, such leakage, either upwardly or downwardly past the piston rings, is augmented by high friction of the piston rings within their grooves. The piston crown wall interfacing with the cylinder bore wall has not been used to restrict blow-by heretofore.

SUMMARY OF THE INVENTION

The invention in a first aspect is a piston assembly operable within a fluid bathed cylinder wall, which comprises (a) a piston body having at least one annular land adapted to be in close fitting relationship to the cylinder wall; (b) an abradable coating tenaciously adhered to at least such one annular land and effective to create and sustain substantially zero clearance with the fluid bathed cylinder wall; and (c) a heat sink in the form of at least one of (i) heat conductors in such coating to conduct heat from the land, and (ii) a piston body interior effective to receive a heat conducting fluid moving along the interior to extract heat therefrom. Such assembly substantially eliminates crevice volume by use of the abradable coating on the upper piston crown wall and is constituted to induce ultra low friction with the cylinder bore wall. Such abradable coating, after operation of the piston assembly, will provide substantially zero clearance therebetween, permitting essentially only a squeeze film of oil between the piston top land and the cylinder bore wall.

Preferably the abradable coating contains (i) conductive material such as flaked copper to promote a highly thermally conductive path from the piston land to the cylinder bore wall to decrease premature ring fatigue failure, and (ii) highly effective solid film lubricant particles to substantially reduce friction, in addition to blow-by. A coating containing the solid lubricants may also be used to cover the surfaces of the groove and piston rings facilitating anti-friction operation of the piston rings (as well as near zero ring/ring groove clearance) and thus further reduce blow-by. To further eliminate the crevice volume more completely, the sizing of the grooves with respect to the thickness of the piston rings is considerably narrowed to a clearance of no greater than 10 microns provided the groove surfaces and piston ring outer surfaces are coated with such solid film lubricants as taught herein.

BRIEF DESCRIPTION OF THE DRAWINGS

FIG. 1 is a sectional view of a portion of a piston and cylinder bore wall assembly embodying the features of this invention;

FIGS. 2 and 3 are still further enlarged views respectively of designated zones of the assembly of FIG. 1.

DETAILED DESCRIPTION AND BEST MODE

Figure 4:
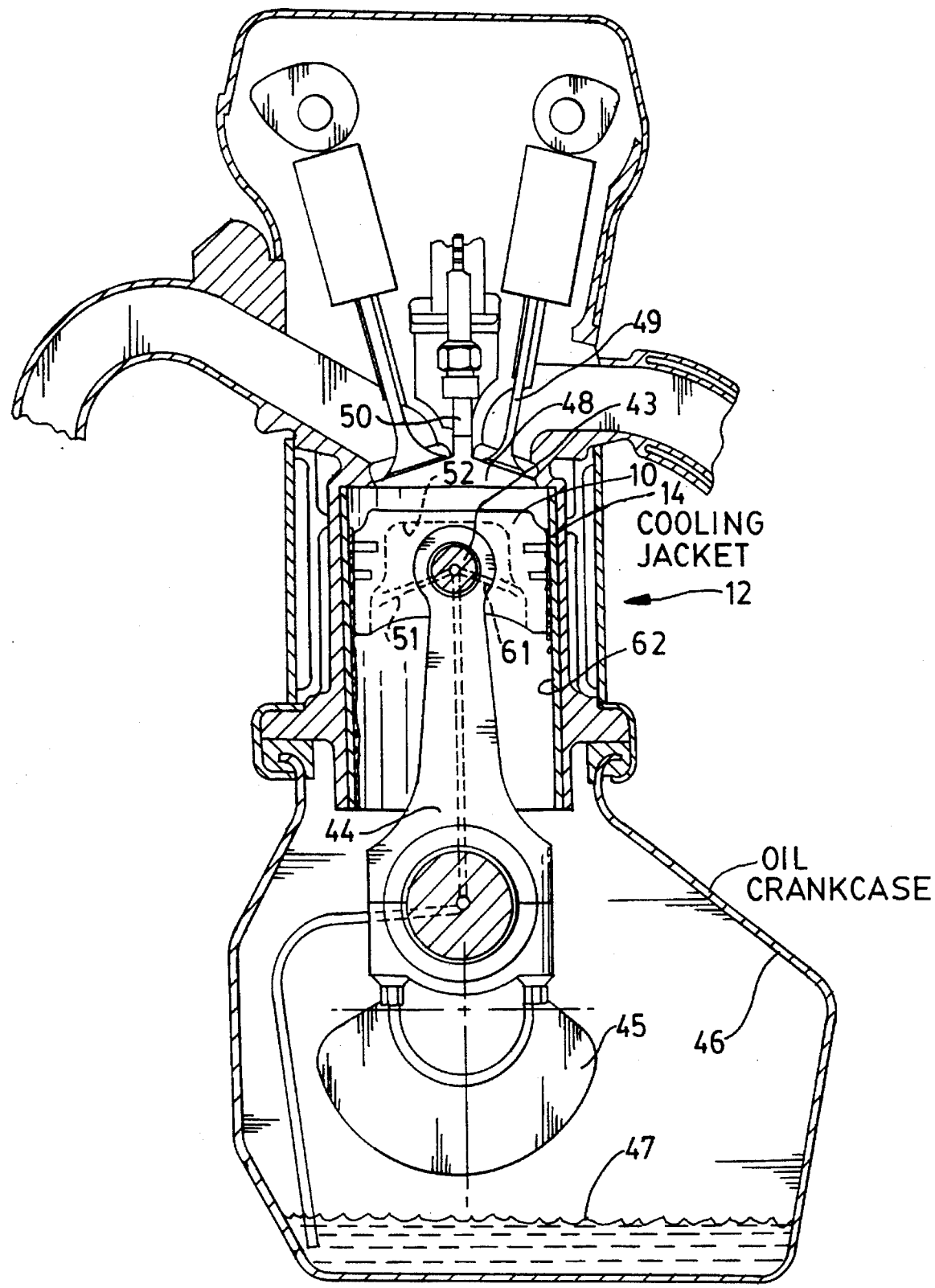
FIG. 4 is an sectional view depicting the overall environment for the piston and cylinder assembly of this invention, showing how oil lubrication can be carried to the interior of the piston body to extract heat from the piston body exposed

As shown in FIG. 4, a piston body 10 is reciprocally operable within a cylinder bore wall 11, forming part of a fluid cooled engine block 12; substantially a zero annular operating clearance between the cylinder bore wall 11 and at least one annular piston land (such as the piston top land 14 or other lands 16 and 17) is attained by use of an abradable coating 15 tenaciously adhered to the respective land. The lands are preferably circular and sized to be in close fitting relationship to the cylinder bore wall 11, i.e. slightly smaller in diameter than the bore 11A of wall 11 by a radial distance of about 5 microns.

The abradable coating 15 contains solid lubricants as well as thermally conductive particles. The coating is deposited over the land 14 (or other lands) in a thickness at least equal, but desirably slightly in excess of any clearance 13 between the lands and the cylinder bore wall, so that during initial engine operation, the coating 15 will abrade and polish to a smooth surface 18 conforming to the annulus of the cylinder bore wall with essentially little or no radial clearance 19 between the coating and the oil film 20 on the cylinder bore wall. To "abrade" in the context of this invention means that the coating will intentionally wear to a desired degree. Abradability herein is not meant to include soft materials such as teflon or fusable substances. The polished abraded surface of the coating will have a smoothness of Ra 5 to 15 microns.

A direct thermal path from the piston crown 22 is created through the coating by dispersion of conductive particles or flakes 23 (such as copper) in the coating matrix 24; additionally or alternatively, a direct thermal path from the piston crown 22, through the piston body itself to the interior surface 25 of the piston body 10 communicates with a cooling fluid 26 sprayed thereagainst to remove heat. The interior surface and sprayed heat conducting fluid should maintain the piston at a temperature no greater than 50° F. of that of the cylinder wall. Thus, a heat sink in the form of heat conductors (particles 23) in the coating to conduct heat from the land, or a heat conducting fluid 26 moving along the interior 25 of the piston extracts heat therefrom.

The piston assembly is effective in either a heat generating engine (such as an internal combustion engine) or a non-heat generating assembly (such as in a pump or compressor). In a heat engine, use of heat conductors in the coating is highly effective to ensure that the temperature of the piston as well as the abradable coating does not exceed a specific level thereby to permit the use of certain ultra low friction materials that maintain thermal stability throughout the life of the engine and coating. In a non-heat type of assembly, such as a pump or compressor, the heat sink will be ideally a moving body of cooling fluid effective to retard thermal growth of the piston crown preventing the piston from expanding at a greater degree than the cylinder bore wall. In a compressor the piston is typically made of aluminum and the cylinder bore wall is typically made of cast iron. Differential thermal expansion of the piston during initial start-up due to the initial interference fit of the coating with the bore wall could cause the abradable coating to wear excessively negating the benefits of the coating fit by attaining substantially zero clearance. (It is imperative to appreciate the function of the abradable coating in this context. The cooling fluid, i.e. oil will maintain the "near zero" piston-crown/bore-clearance at all times). When the coolant fails, the coating will abrade away and engine failure is prevented.

With substantially zero clearance (equal to or less than 5 microns radial clearance) the piston can operate within the cylinder bore wall with no more than a gas squeeze film lubrication therebetween, assuming the oil film on the cylinder bore wall should fail. In the event the clearance 19 between the coating and the cylinder bore wall or oil film thereon, is designed or allowed to become greater than 5 microns, for example, up to 10 or 15 microns, then the abradable coating should contain a required content of solid film lubricants. A solid lubricant is defined herein to comprehend any solid material that have coefficient of friction no greater than 0.03–0.06 at −10° to 375° F. and thermally stable at such temperatures. A coating that meets such criteria should have a specific combination of solid lubricants that perform well at high temperatures at least up to 600° F. and also attracts oil. This higher temperature capability is to safe guard the piston system function in the event of the oil lubricant and/or coolant failure. The lubricants (such as graphite whose lubricating is facilitated by the presence of occluded $H_2O$ materials in its crystal structure) are carried in a matrix (such as epoxy polymer) of the coating that assists in replenishing the lubricant with water at high temperatures. The solid film lubricants may comprise a mixture of at least two elements selected from the group consisting of graphite, molydisulphide and boron nitride; the mixture is carried in a polymer emulsion for deposition, the polymer (polyamide or epoxy thermoset type) adhering the film coating to the land surface. For tenacity, the piston land is desirably oxidized or anodized as well as micro etched prior to such adherence. Graphite, once selected, should be present in an amount of 29–58% by weight of the mixture. Graphite is effective as a solid lubricant usually up to temperatures around 400° F. Molybdenum disulfide, when selected, should be present in an amount of 29–58% by weight of the mixture and most importantly is effective to increase the load bearing capability of the mixture up to a temperature of at least 580° F. but will break down at temperatures in excess of 580° F. in an air or non-reducing atmosphere. Molybdenum disulfide reduces friction in the absence or presence of oil and, most importantly, supports loads of at least 10 psi at such temperatures. Molybdenum disulfide is also an oil attractor useful in the environment of this invention. Boron nitride, when selected, should be present in an amount of 7–16% by weight of the mixture; it increases the stability of the mixture up to temperatures as high as 700° F. and concurrently stabilizes the temperature for the ingredients of molybdenum disulfide and graphite as well as the polymer. Boron nitride is an effective oil attractor.

Particle size control of the individual ingredients for the solid film lubricant mixture is important to avoid subsequent machining and to stay suspended in the oil when abraded. The particles should preferably be ultra fine, no greater than about 1–5 microns in average size. Graphite, preferably can be introduced into the mixture in the range of 0.5–4.0 microns, molybdenum disulfide in the range of 0.3–4.5 microns, and boron nitride at about 5 microns. The mixture is typically ball milled to produce an average particle size of 0.3–4 microns. Boron nitride is capable of supporting loads of 5 psi but when part of a mixture with graphite and boron nitride in the aforementioned polymer, loads as high as 500 psi at temperatures up to 400° F. can be supported. Thus, the optimum mixture contains all three ingredients, which will provide for a temperature stability up to temperatures as high as 700° F., load bearing capacities well above 10 psi and excellent oil attraction capability. The combination of all three elements will provide a coefficient of friction which is in the range of 0.07–0.08 at room temperature and a coefficient of friction as low as 0.03 at 700° F.

The thermoset polymer is preferably comprised of epoxy or polyamide present in an amount of 30–60% of the mixture. The polymer crosslinks at temperatures of 375° F. to form a rigid cement-like structure that provides hydrocarbon and water vapor transfer to the graphite while attracting oil and adheres very well to an aluminum metal support that has been precoated with a phosphate ester type epoxy or a zinc phosphate. The polymer also should contain a curing agent present in the amount of 2–5% of the polymer such as dicyanidimide; the polymer may also contain a dispersing agent present in an amount of 0.3–1.5% such as 2,4,6-tridimethyl aminoethyl phenol. The carrier for such polymer may be mineral spirits or butyl acetate.

The coating is abradable due to the presence of copper flake in a particle size of 5 to 15 microns, the particles having an aspect ratio of at least 2 and preferably 10. To understand how the abradable coating of this invention functions in the environment of a piston assembly, it is necessary to describe other aspects of the piston. A conventional three-ring aluminum alloy (i.e. 12–18% silicon) piston design, such as shown in FIG. 4 is adapted to operate within an aluminum or cast iron cylinder bore wall. The piston body comprises several ring grooves (30,31,32) that are annularly defined in the body of the piston, the ring grooves separating the side wall 33 of the piston into what has been previously referred to as piston lands. A single angular compression ring is carried within each of the top two (in case of three groove piston) or tip three (in case of four groove piston) ring grooves to dynamically and adjustably maintain contact between the piston body and the cylinder bore wall. The top ring 34 (top compression ring) is located approximately 5–6 mm below the piston crown 35 or even greater than 10 mm. The axial clearance between the top ring groove 30 and the top ring 34 itself is about 40–50 microns (0.002 inches) in the prior art, but restricted to 10 microns or less herein. Such 10 micron clearance is made possible by coating the grooves and rings with solid film lubricant coating 60 as will be described. The clearance diameter between the top land 36 and the cylinder bore wall 37 is designed to prevent interference during cold starts or other conditions that induce rapid expansion of the piston crown while the bore grows relatively slowly. (It should be remembered that the oil spray on the underside will prevent piston crown growth during this period.) The ring face (surface riding on the bore surface/oil film) is of a barrel profile to promote rapid hydrodynamic film formation and easy glide during both upward as well as downward piston travel.

A second ring 38 (scraper or second compression ring) is located in the second groove 31 which is located about 3–5 mm or more below the top groove 30. The piston outer surface between the top ring groove 30 and the second ring groove 31 is the second land 39 (in the case of a gasoline/spark ignition engine the ring pack usually consists of three rings, whereas in diesel engines there will be four or more rings). The second ring groove can also have a 10 micron clearance if a solid film lubricant coating is used. The second ring face can be of a tapered wedge profile slightly rounded at the outer edge (this rounding can either result from wear or is designed in) to facilitate scraping off the oil layer from the cylinder wall during the piston downward travel without incurring excessive friction losses. It also serves to scrap off the excessive oil to maintain a thin oil film, preferably with a viscosity of about 5 to 200 cp.

The third ring 40 is the oil control ring which fits within the third ring groove 32 and is carefully designed to maintain an oil film on the bore surface while scraping off and returning excess oil to sump 41. Each of the grooves and the rings are coated with solid film lubricant 60 in a mixture as described for the abradable coating. The only difference between the land coating and the groove/ring coating is the presence of copper flake that facilitates abradability in the land coating.

The piston skirt 42 plays a major roll in controlling piston slap related noises as well as friction, oil consumption and blow-by. Together the oil rings and the piston skirt constitute at least 60% of the piston system friction and the application of solid film lubricant coating on the piston lands will reduce the friction significantly if the clearance with the coating is within the range that is necessary for a gas squeeze film lubrication system. Piston slap results from the piston being pinned at 43 at a connecting rod 44 which in turn is connected to a crankshaft 45 operating in a crankcase 46 which holds an oil sump 47. The piston crown is exposed to high gas temperatures from the combustion chamber 48 ignited by device 50 and which is alternately charged and exhausted by valve system 49.

As shown in FIG. 3, the polymer and solid lubricant mixture for the abradable coating is blended with 80–90% by weight copper flake of aspect ratio at least 2–20 and of particle size not exceeding 15 microns (the net binder to pigment ratio should be less than 35:65); for a thermoset binder using a water base or organic solvent base, the binder to pigment ratio should be less than 30:70. Selection of the copper particle size should be to provide an unimpeded thermal condition path through the coating and yet provide excellent adhesion to the substrate which is preferably an aluminum piston land.

The abraded material, upon initial operation of the assembly, will be carried away by the oil lubricant and either removed by the oil, as a suspension, filter or be in a fine enough form to reside in the oil to provide friction reduction at any rubbing surfaces analogous to the friction reduction additives in oil. Copper in itself has a low friction coefficient (F=0.2) and when oxidized in the engine environment yields a lower friction coefficient in the oxide form (0.12–0.15 for cuprous oxide and 0.2–0.3 for cupric oxide). In comparison, other metals such as iron and aluminum produce oxides with higher friction coefficients (ferrous oxide 0.25–0.3, ferric oxide 0.35–0.4, and aluminum oxide greater than 0.4).

Prior to the application of the coating, the ring land surfaces are preferably knurled or roughened (to Ra 5–25 microns) and given a surface treatment such as hydrofluoric acid etching, grit blasting and hydrofluoric acid etching, or phosphating or hard anodizing, to provide adequate coating adhesion and durability for the life of the coated piston. Assembly of the slightly oversized coated piston into the cylinder bore can be by shrink fit, cooling the piston or piston end bore to about −10° F.

Because of the coating's high abradability, the piston itself is sized to achieve virtual zero piston land/bore clearance at installation, having the coating incorporated thereon. The affinity of the coating for an oil will assist in maintaining an oil film between the piston land and bore surface, as well as ring and ring groove surfaces. Upon operation of the installed piston, the coating will abrade sufficiently to adapt the coating shape to the cylinder bore while maintaining substantially zero clearance. As a consequence the piston ring land/bore clearance will substantially eliminate the corresponding crevice volume allowing the ring grooves to be designed lower and which moved downward (greater than the present 5 mm). This is partially beneficial when coated aluminum rings (which have the feature of conformability to bore geometry) re used. When the clearance is equal to or less than 5 microns, the flow of combustion gases past the piston is very low under dynamic piston conditions and will create a gas squeeze film; the gas film has very high lubricating, low friction capability. Because of the prevailing high temperatures the gas viscosity will be high, gas viscosity increasing with increasing temperature which correspondingly increases load bearing capability of the gas film. In contrast, oil viscosity decreases with increasing temperature resulting in a decrease in load bearing capability of the oil film. During the expansion stroke of the piston, the coated land will be covered by the gas squeeze film (because of the gas pressure) in the clearance annulus and will support the piston.

Heat will be conducted through the coating to the cylinder bore wall or the oil film on the cylinder bore wall as a result of the presence of the conducting particles; heat will also be extracted from the piston by cooling oil jets or spray 51 directed to the underside 52 of the piston. Oil may be drawn from the sump 47 (oil pump provides the pressure) and is carried through the crankshaft and connecting rod where it directed through radial channels 61 to spray against the interior underside 52 of the piston. Both conducting paths combine to cool the piston during expansion and the exhaust stroke which minimizes heat input to the gas charge (during the intake stroke). This results in improved volumetric efficiency in the heat engine. Even in non-heat generated assemblies such as a compressor or pump, the extraction of heat controls the thermal expansion of the piston during initial break-in so as not to unduly abrade the coating, and because of the low friction and reduced clearance, the pump efficiency is greatly improved.

The cooling fluid or jets 51 avoid excessive abrasion of the top ring land coating during cold starts. Limited abrasion of the coating prevents seizure and scuffing of the pistons and bores in the event of coolants/oil pump failures. Experiments show that the engine oil flow will achieve full dynamic pressure within 0.5–1.5 seconds after start at 0° F. with conventional 10–30 weight oil lubricant (or in less than half second with 5–30 weight oil). The piston's crown will experience at least five firing cycles in the first second and it will take approximately 10–20 seconds at engine idle for the piston crown to attain a temperature in the 70°–150° F. range. During this period the cooling fluid is still at or near 0° F. and therefore the bore diameter is relatively unchanged. In the absence of piston cooling (or, failure of the latter) the relative thermal growth of the piston crown may cause interference with the bore and will cause the abradable coating to excessively wear. Such excessive wear will negate the benefits described above that are achieved through substantially zero clearance. However, serious damage to the piston system is prevented when the piston cooling fails.

We claim:

1. A piston assembly operable within a fluid bathed straight cylindrical cylinder wall said piston having a crown exposed to pressurized fluid, comprising:

(a) a piston body having at least one annular straight cylindrical land, adjacent the piston crown, adapted to be in close-fitting complementary relationship to said cylinder wall;

(b) an abradable coating tenaciously adhered to said at least one land effective to create and sustain substantially zero clearance along the whole of said at least one land with said fluid bathed cylinder wall; and (c) a heat sink in the form of heat conductors in said coating to conduct heat from said lands to said fluid bathed cylinder wall.

2. The piston assembly as in claim 1, which comprises additional heat sink of a fluid bathed piston body interior using a cooling fluid sprayed along said body interior, said sprayed fluid maintaining said piston at a temperature no greater than 50° F. of that of the cylinder wall.

3. The assembly as in claim 1, in which said heat conductors in the coating comprise 80–90% by weight of the coating to conduct heat from the land.

4. A piston assembly operable within a fluid bathed cylinder wall, comprising:

(a) a piston body having at least one annular land adapted to be in close-fitting relationship to said cylinder wall;

(b) an abradable coating tenaciously adhered to said at least one land effective to create and sustain substantially zero clearance with said fluid bathed cylinder wall, said abradable coating comprising solid lubricants of at least two selected from the group consisting of graphite, molydisulphide and boron nitride;

(c) a heat sink in the form of heat conductors in said coating to conduct heat from said lands to said fluid bathed cylinder wall, said heat conductors consisting of copper particles distributed throughout said coating.

5. The piston assembly as in claim 4, in which said copper particles constitute at least 70–90% by weight of said abradable coating and have an aspect ratio of 2–20.

6. The piston assembly as in claim 5, in which said copper particles are converted to oxides upon operation of the piston assembly which oxides additionally become a solid lubricants in said coating.

7. The piston assembly as in claim 4, in which the radial clearance between said coated piston and an oil bathed cylinder bore wall is no greater than 10 microns.

8. The piston assembly as in claim 7, in which said fluid bathed cylinder wall is bathed with an oil having viscosity in the range of 5 to 200 cp.

9. In a pump, compressor or heat engine, an oil bathed piston and cylinder assembly, carrying an oil film along the cylinder wall, said oil film having a viscosity in the range of 5 to 200 cp, comprising:

(a) a piston body having a central axis of movement and at least one land in close fitting relationship with said cylinder wall;

(b) a plurality of grooves in said piston body facing the cylinder wall, said grooves being spaced along or around said axis of the piston body;

(c) an abradable solid film lubricant coating tenaciously adhered to at least said land effective to create substantially zero clearance between the oil film of said cylinder wall and said piston body, said coating containing heat conductors to conduct heat from said land, said coating consisting of copper flakes having a particle size in the range of 5 to 25 microns with an aspect ratio of 1–20;

(d) compression sealing elements carried in said grooves to dynamically and adjustably maintain contact between the piston body and cylinder wall; and (e) a solid film lubricant coating said grooves and sealing elements.

10. In a pump, compressor or heat engine, an oil bathed piston and cylinder assembly, said piston having a working surface for compressing fluids, said assembly carrying an oil film along a cylinder wall, said oil film having a viscosity in the range of 5 to 200 cp, comprising:

(a) a piston body having a central axis of movement and at least one land in close fitting relationship with said cylinder wall, said land being adjacent said working surface, said piston body also having an interior receiving a heat conducting fluid therealong to promote a first heat sink effect;

(b) a plurality of grooves in said piston body facing the cylinder wall, said grooves being spaced along or around said axis of the piston body;

(c) an abradable solid film lubricant coating tenaciously adhered to at least said land effective to create substantially zero clearance between the oil film of said cylinder wall and said piston body, said coating containing particles to establish a heat sink effect to said cylinder wall;

(d) compression sealing elements carried in said grooves to dynamically and adjustably maintain contact between the piston body and oil film of said cylinder wall; and (e) a solid film lubricant coating only said grooves and sealing elements.

11. The piston and cylinder assembly of claim 10, which further comprises means depending from the piston body to stabilize the motion of the piston body within the cylinder wall.

* * * * *